United States Patent [19]

Gandelman et al.

[11] Patent Number: 4,829,224
[45] Date of Patent: May 9, 1989

[54] BATTERY PACK FOR CELLULAR TELEPHONE

[76] Inventors: George Gandelman, 9 Island Ave., Apt. #1602, Miami Beach, Fla. 33140; Carlos Somarriba, 11359 SW. 5th Ter., Miami, Fla. 33174

[21] Appl. No.: 197,638

[22] Filed: May 23, 1988

[51] Int. Cl.$^4$ .................. H01M 10/46; H04B 1/08
[52] U.S. Cl. ........................... 320/2; 455/90; 429/99
[58] Field of Search .............. 320/2, 13; 455/90; 429/99

[56] References Cited

U.S. PATENT DOCUMENTS

| | | | |
|---|---|---|---|
| 4,558,270 | 12/1985 | Liautaud et al. | 320/2 |
| 4,641,370 | 2/1987 | Oyamada | 455/90 X |
| 4,709,201 | 11/1987 | Schaefer et al. | 455/90 X |

*Primary Examiner*—R. J. Hickey
*Attorney, Agent, or Firm*—John Cyril Malloy

[57] ABSTRACT

In one embodiment, the rechargeable, auxiliary battery pack includes a housing made of insulative material that defines an enclosed space and has a top surface cavity which companionately seats a bottom region of a cellular telephone. A bracket holds a standard battery of the telephone as a vertical extension from one end wall of the top surface cavity. A plurality of batteries comprise a battery subassembly that is disposed in the interior of the housing. A four prong female connector is electrically coupled to the battery subassembly and is adapted to mate with a four prong male connector. The male connector is coupled to a 9 volt voltage regulator and beyond the regulator is connected a male plug that is insertable in a car lighter socket such that power from an automobile can be drawn via its lighter to recharge the battery subassembly and enable activation of the cellular telephone. The auxiliary battery pack also includes a female socket that mates with the male plug. The female plug is electrically connected to a 120 volt AC to 9 volt DC transformer.

5 Claims, 3 Drawing Sheets

BATTERY PACK FOR CELLULAR TELEPHONE

BACKGROUND OF THE INVENTION

The present invention relates to a rechargable, auxiliary battery pack for a cellular or mobile telephone that has a standard battery.

One type of portable cellular or mobile telephone is a Motorola 8000S portable telephone. The 8000S mobile telephone is equipped with a standard, rechargable battery pack. However, after fully recharging the standard battery for eight hours, the battery only allows for two hours of standby time for the cellular telephone and 30 minutes of talking time when the telephone is fully activated. Motorola offers an optional adapter for powering the cellular telephone from the cigarette lighter in an automobile. This adapter is a male plug which fits within the female cigarette lighter of the automobile. Further, Motorola also offers, as an option, an AC adapter for the cellular telephone such that a common, 120 volt AC power is transformed into 9 volt DC power utilized by the telephone.

Due to the short battery life of this cellular telephone and the expense and size of the optional adapters, there exists a need for an auxiliary battery pack and an integrated, two piece adapter set for both car and home use of the cellular telephone.

OBJECTS OF THE INVENTION

It is an object of the present invention to provide a rechargable, auxiliary battery pack for a cellular telephone.

It is a further object of the present invention to provide a battery pack which can be simultaneously charged while the mobile telephone is being fully activated, i.e., during a telephone conversation.

It is another object of the present invention to provide an integrated, two piece adapter set for the auxiliary battery pack.

It is an additional object of the present invention to provide an auxiliary battery pack that is a compact, base extension from the base of the mobile or cellular telephone.

SUMMARY OF THE INVENTION

In one embodiment, the rechargable, auxiliary battery pack includes a housing made of insulative material that defines an enclosed space and has a top surface cavity which companionately seats a bottom region of a cellular telephone. A bracket holds the standard telephone battery as a vertical extension from one end wall of the top surface cavity. A plurality of batteries comprise a battery subassembly that is disposed in the interior of the housing. A four prong female connector is connected to the subassembly and adapted to mate with a four prong male connector that is part of the integrated, two-piece adapter set. The male connector is coupled to a 9 volt, voltage regulator. Beyond the regulator is connected a male plug insertable in a car lighter socket such that power from an automobile can be drawn via its lighter to recharge the battery subassembly as well as provide power to the cellular telephone. The second piece of the adapter set includes a female socket, into which fits the male plug, and a 120 volt AC to 9 volt DC transformer.

BRIEF DESCRIPTION OF THE DRAWINGS

Further objects and advantages of the present invention may be found in the accompanying detailed description of the preferred embodiments when taken in conjunction with the accompanying drawings in which.

DETAILED DESCRIPTION OF THE PREFERRED EMBODIMENT

The present invention relates to a rechargable, auxiliary battery pack for a cellular telephone.

Figure 1:
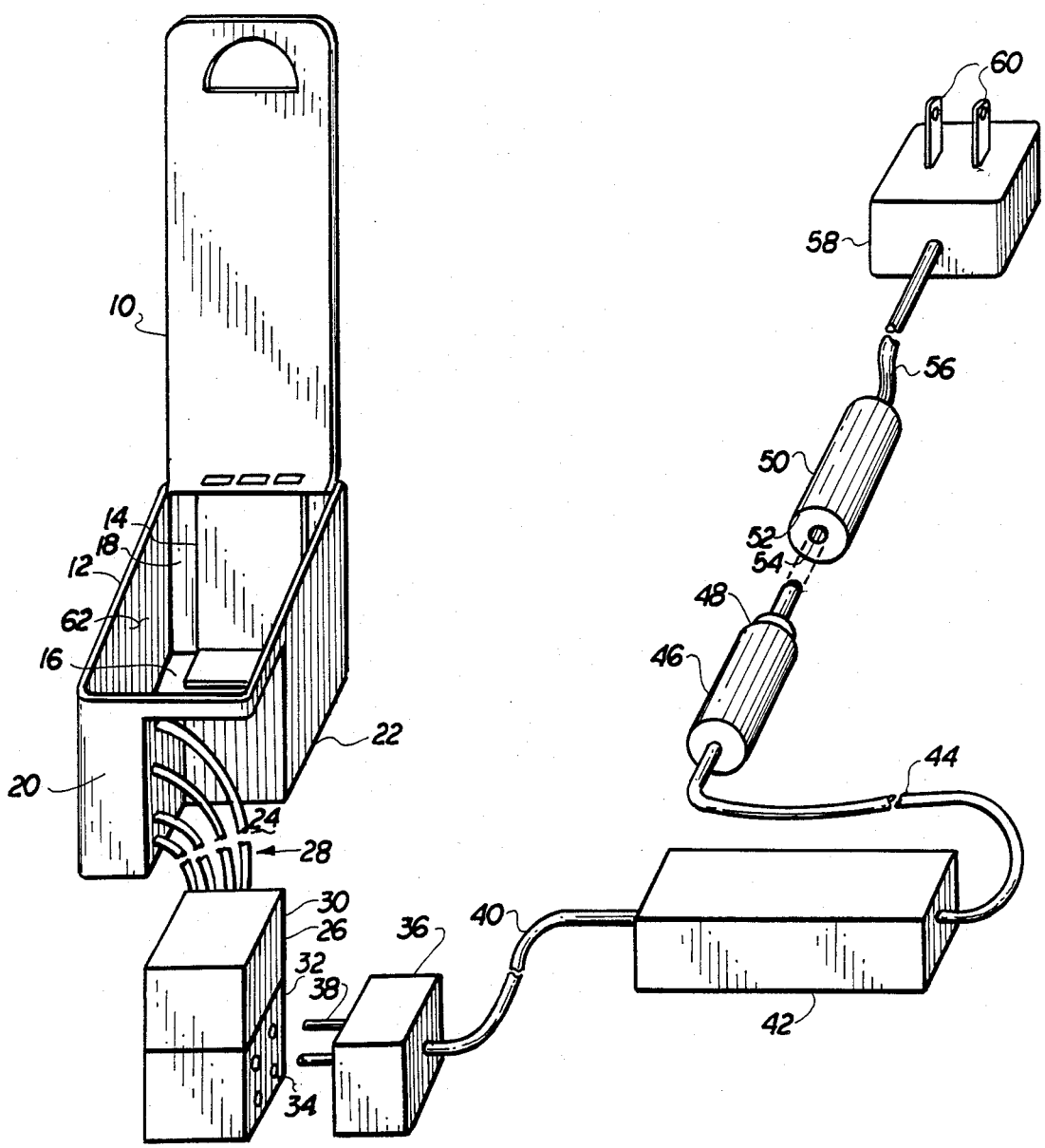
FIG. 1 illustrates various portions of the auxiliary battery pack in accordance with the principles of the present invention.

FIG. 1 illustrates, from a perspective view, the principle components of the auxiliary battery pack. However, it does not show the battery subassembly for the auxiliary battery pack. Cellular or mobile telephones normally include a standard battery pack 10. Standard battery 10 is attached to housing 12 by bracket 14. The housing is made of an insulating material such as plastic. Bracket 14 is connected to housing bottom 16 and to rear wall 18 by a well known mechanism. Front wall 20 and side wall 22 of housing 12 have a corner cutout 24 which companionately mates with a substructure 26.

Electrical wires 28 extend between housing 12 and substructure 26. Substructure 26 includes upper part 30 and female connector 32. Upper part 30 is hollow and includes an open side face (not shown) such that wires 28 can be stored in the interior thereof. The wires are connected to the female connecting terminals, one of which is female terminal 34, in female connector 32.

A male connector 36 includes male terminal pins, one of which is male terminal 38, extending from one surface thereof. The male terminal pins in male connector 36 mate with the female terminals in female connector 32. Cable 40 extends between male connector 36 and a regulator 42. Cable 40 may include a plurality of electrical wires therein. A second cable 44 extends between regulator 42 and a male car plug 46 that is adapted to companionately mate with the female cigarette lighter socket in an automobile. To accomplish this, distal end 48 of male plug 46 is shaped to fit within the female socket of the cigarette lighter. These components, connector 36, regulator 42, and plug 46 form the first piece of the integrated adapter set.

A female socket 50 includes, at proximal end 52, a socket region 54 that is adapted to mate with distal end 48 of male plug 46. Another electrical cable 56 extends between female socket 50 and an AC transformer 58. Male prongs 60 extending from the transformer are standard electrical socket prongs adapted to fit within a 120 volt AC power supply socket. These components form the second piece of the integrated adapter set.

It should be noted that FIG. 1 does not show the subassembly of batteries that are rechargable either from an automobile cigarette lighter socket via male plug 46, regulator 42 and male connector 36, or from an AC power outlet via transformer 58, female socket 50, male plug 46, regulator 42, and male connector 36. However, the battery assembly is disposed in the inside of housing 12 in a space 62.

Figure 2:
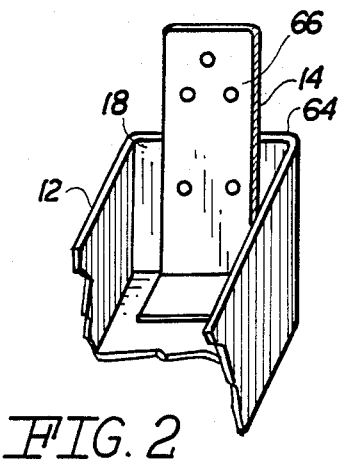
FIG. 2 illustrates a cutaway segment of the housing for the auxiliary battery pack.

FIG. 2 shows a portion of housing 12 with bracket 14 extending vertically beyond edge 64 of rear wall 18. The vertically extensive portion 66 of bracket 14 is affixed to the backside of standard battery 10 that is shown in FIG. 1.

Figure 3:
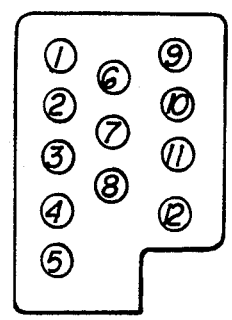
FIG. 3 is a plan view showing the location of the standard batteries utilized in the auxiliary battery pack.
Figure 4:
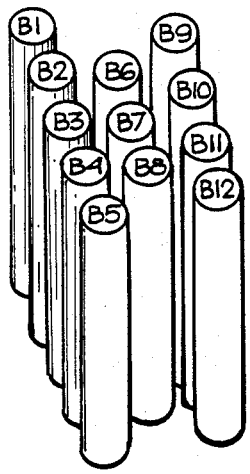
FIG. 4 illustrates a perspective view of the battery subassembly.
Figure 5:
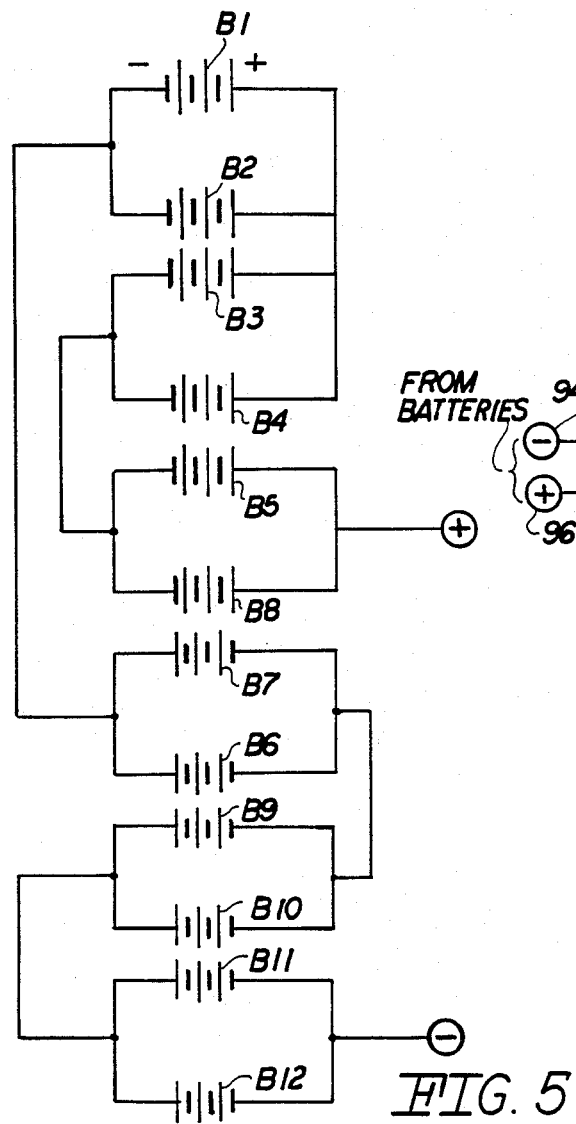
FIG. 5 illustrates an electrical schematic showing the interconnection of the battery subassembly.

FIGS. 3, 4 and 5 show the battery subassembly for the auxiliary battery pack. FIG. 3 shows a plan view of 12 batteries which make up the battery subassembly. In a preferred embodiment, each battery is an elongated standard, 1.5 volt, dry cell, rechargable battery. The batteries are numbered B1 through B12 in FIGS. 4 and 5. When the 12 batteries are placed in the configuration shown in FIGS. 3 and 4, the battery subassembly easily fits within space 62 in the interior of housing 12 shown in FIG. 1.

The 12 batteries are paired into six parallel sets. Each pair of batteries is serially connected such that the battery subassembly generates nine volts from the positive and negative subassembly terminals shown in FIG. 5. Also in FIG. 5, the top and bottom of the battery is designated for the battery subassembly.

Figure 6:
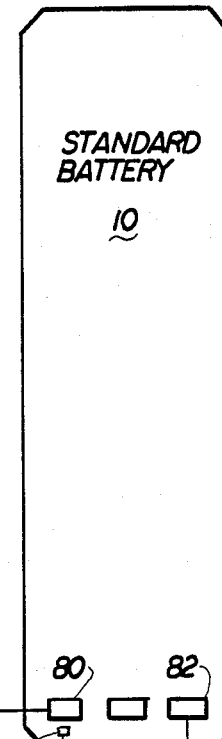
FIG. 6 is an electrical, block diagram of the interconnection between the female connector and the standard battery associated with the mobile telephone.
Figure 6:
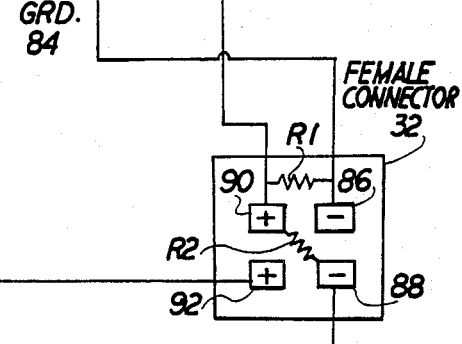

FIG. 6 shows an electrical, block diagram of the interconnections of the battery subassembly, female connector 32 and standard battery 10. Standard battery 10 includes a battery power input terminal 80 and an auxiliary power input terminal 82. Additionally, standard battery 10 has a negative ground terminal 84.

Female connector 32 has two negative female terminals 86 and 88 and two positive female terminals 90 and 92. Resistor R1 electrically connects negative female terminal 86 with positive female terminal 90. Resistor R2 electrically connects positive female terminal 90 and negative female terminal 88.

The negative battery subassembly terminal 94 is electrically connected to battery power input terminal 80 of standard battery 10. The battery subassembly negative terminal is also connected to positive female terminal 92. The positive battery subassembly terminal 96 is solely electrically connected to negative female terminal 88.

Positive female terminal 90 is electrically connected to auxiliary power input terminal 82 of the standard battery 10. Negative female terminal 86 is electrically connected to ground 84 of the standard battery.

As will be discussed later with respect to FIG. 7, when the male connector is coupled to the female connector, a positive DC voltage is applied to both positive female terminals 90 and 92 and a negative DC voltage is applied to negative female terminals 86 and 88. In operation and in the absence of external power being supplied to the entire system, current from the battery subassembly flows from positive battery subassembly terminal 96 to negative female terminal 88, through resistor R2, to positive female terminal 90 and ultimately to auxiliary power input terminal 82 of standard battery 10. Return of the current is from terminal 80 to negative battery subassembly terminal 94.

When an external source of power is available via the male connector, positive DC voltage is present at positive female terminals 90 and 92. Therefore, current flows into auxiliary input terminal 82 of standard battery 10 as well as flows into negative battery subassembly terminal 94. This enables both charging and activation of the cellular telephone. The return is formed by ground terminal 84 and negative female terminals 86 and 88 and from positive battery subassembly terminal 96.

Figure 7:
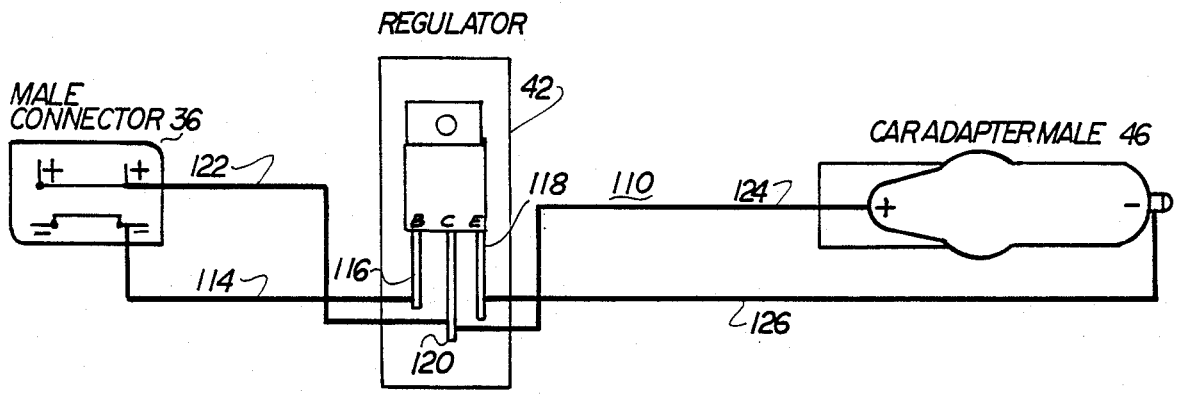
FIG. 7 illustrates an electrical, block diagram of the male connector, regulator and male plug for the car lighter socket.
Figure 8:
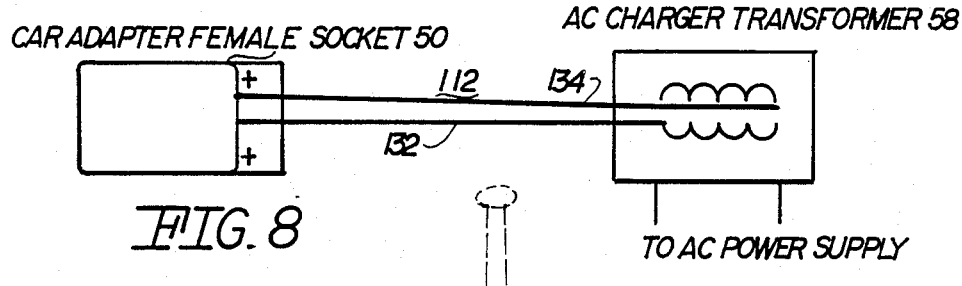
FIG. 8 illustrates an electrical, block diagram of the female adapter socket and the AC charger or transformer; and, FIG. 9 illustrates the auxiliary battery pack set below a cellular telephone that is shown in dashed outline.

FIGS. 7 and 8 illustrate electrical block diagrams for the integrated, two-piece adapter set for the auxiliary battery pack. FIG. 7 illustrates automobile adapter subassembly 110 and FIG. 8 illustrates a 120 volt AC adapter subassembly 112. In FIG. 7, male connector 36 has two positive male terminal pins and two negative male terminal pins. A jumper electrically connects the positive terminal pins and another jumper respectively connects the negative male terminal pins. An electrical connection 114 electrically connects the negative terminals of connector 36 to output terminal 116 of a standard voltage regulator that maintains a 9 volt DC output. In one embodiment, the 9 volt regulator is a PNP, 1.0A regulator. This regulator has an input terminal 118, a common line terminal 120 and an output terminal 116. The common line terminal 120 is connected via a connecting wire 122 to the positive male terminals of male connector 36. At the input side of the subassembly 110 is a male plug 46. The positive terminal of male plug 46 is connected via connecting wire 124 to common line terminal 120 of regulator 42. The negative terminal of male plug 46 is connected via wire 126 to input terminal 118 of regulator 42. AC power from the automobile cigarette lighter is transferred via male plug 46 through regulator 42 and male connector 46 to the female connector 32.

FIG. 8 shows adapter assembly 112 that includes female socket 50 electrically connected via wires 132 and 134 to AC charger transformer 58. When transformer 58 is supplied with 120 volt AC power, it converts that 120 volt AC power into a 9 volt DC voltage and supplies that DC voltage to the positive and negative terminals of female socket 50. The DC current is then passed through male plug 46, regulator 42 and male connector 36 to the standard battery and battery subassembly.

Figure 9:
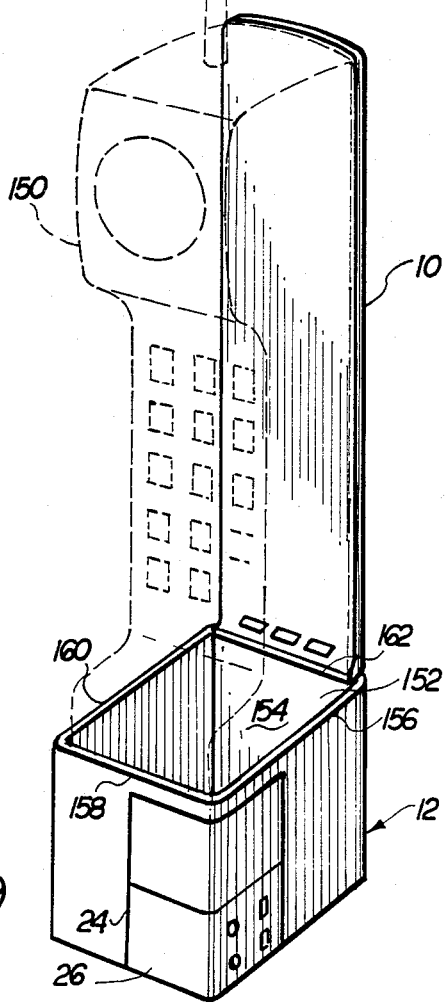

FIG. 9 is a perspective view of the auxiliary battery pack with cellular or mobile telephone 150 shown in dashed outline. The battery subassembly is placed in the interior of housing 12 and a roof plate 152 is placed over the battery subassembly and interconnecting wires. A surface cavity 154 is created at the top of housing 12. Top wall portions 156, 158, 160, and 162 matingly fit with the bottom region of cellular telephone 150. Standard battery 10 extends vertically upward beyond wall portion 162 of housing 12 and provides a backing surface plane for telephone 150. As clearly seen in FIG. 9, substructure 26 closely fits within cutout 24 thereby providing a compact, auxiliary battery pack for cellular telephone 150. The claims appended hereto are meant to cover the modifications and changes within the scope and spirit of the present invention.

What I claim is:

1. A rechargable, auxiliary battery pack having an input adapted to be coupled to either an automobile cigarette lighter socket power source or an AC power supply and an output adapted to be connected to a standard battery that is connected to a cellular telephone, the auxiliary battery pack comprising:

a housing made of insulative material, defining an enclosed space, and having a top surface cavity which companionately seats a bottom region of said cellular telephone;

means for retaining said standard battery as a vertical extension beyond one wall of said top surface cavity;

a plurality of batteries electrically connected in series and developing a terminal voltage across collective positive and negative terminals equal to the voltage of said standard battery, said plurality of batteries disposed within said enclosed space;

a detachable, four prong, connector pair having first and second connectors with two positive and two negative connection terminals on each, said first connector having a positive and a negative jumper means respectively electrically connecting the two positive connection terminals and the two negative connection terminals, said second connector having a first negative connection terminal connected via a first resistor to a first positive connection terminal, and said first positive connection terminal connected via a second resistor to a second negative connection terminal of said second connector;

a first cabling means electrically connecting said first negative connection terminal of said second connector to a negative pole of said standard battery, a second cabling means connecting said first positive connection terminal of said second connector to a first positive pole of said standard battery, a third cabling means jointly interconnecting said negative collective terminal of said plurality of batteries with said second positive connection terminal of said second connector and with a second positive pole of said standard battery, and a fourth cabling means connecting said positive terminal of said plurality of batteries to said second negative connection terminal of said second connector;

a voltage regulation means having an input, an output and a common electrical line, said output line connected to said positive connection terminals of said first connector, said common line connected to said negative connection terminals of said first connector;

a male plug adapted to fit within and be electrically coupled to said automobile cigarette lighter socket, said male plug having a positive and a negative wire output respectively connected to said common line and said input line of said regulation means;

a female socket adapted to mate with and electrically couple with said male plug, said female socket having first and second connection leads; and, an alternating current transformer means for converting said AC power supply into DC, said transformer means having two outputs connected to said first and second connection leads of said female socket.

2. An auxiliary battery pack as claimed in claim 1 wherein said plurality of batteries is a plurality of serially connected battery pairs, each battery pair having two batteries connected in parallel.

3. An auxiliary battery pack as claimed in claim 2 wherein each battery is a 1.5 volt battery.

4. An auxiliary battery pack as claimed in claim 3 wherein said voltage across said collective battery terminals equals 9 volts.

5. An auxiliary battery pack as claimed in claim 1 wherein said means for retaining includes an angled bracket, one angled portion of the bracket being attached to the bottom, interior surface of the housing and the other angled portion being adjacent one vertical wall of said housing and extending beyond an upper wall edge of said housing such that the extensive portion is adapted to be attached to said standard battery.

* * * * *